US009759549B2

(12) United States Patent
Nobayashi

(10) Patent No.: US 9,759,549 B2
(45) Date of Patent: Sep. 12, 2017

(54) DISTANCE DETECTING DEVICE

(71) Applicant: CANON KABUSHIKI KAISHA, Tokyo (JP)

(72) Inventor: Kazuya Nobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 14/420,783

(22) PCT Filed: Sep. 6, 2013

(86) PCT No.: PCT/JP2013/074776
§ 371 (c)(1),
(2) Date: Feb. 10, 2015

(87) PCT Pub. No.: WO2014/042232
PCT Pub. Date: Mar. 20, 2014

(65) Prior Publication Data
US 2015/0241205 A1    Aug. 27, 2015

(30) Foreign Application Priority Data

Sep. 12, 2012  (JP) .................... 2012-200059
Aug. 3, 2013   (JP) .................... 2013-161914

(51) Int. Cl.
G01B 11/14     (2006.01)
G02B 7/34      (2006.01)

(52) U.S. Cl.
CPC ............. *G01B 11/14* (2013.01); *G02B 7/34* (2013.01)

(58) Field of Classification Search
CPC .................................................. G01B 11/14
See application file for complete search history.

(56) References Cited

U.S. PATENT DOCUMENTS 9,576,370 B2 *  2/2017  Komatsu .............. G06T 7/593
2011/0096211 A1  4/2011  Oikawa et al.
(Continued)

FOREIGN PATENT DOCUMENTS

JP  2003244712 A    8/2003
JP     4027113 B2  12/2007

OTHER PUBLICATIONS

U.S. Appl. No. 14/417,367, filed Jan. 26, 2015.
(Continued)

*Primary Examiner* — James Pontius
(74) *Attorney, Agent, or Firm* — Fitzpatrick, Cella, Harper & Scinto

(57) ABSTRACT

A distance detecting device includes computing unit for detecting a distance to a subject on the basis of a first signal due to a light flux that has passed through a first pupil area of an imaging optical system and a second signal due to a light flux that has passed through a second pupil area of the imaging optical system, the first signal and the second signal being generated by image pickup member formed by arranging a plurality of pixels. The computing unit defines tentative distance detection ranges as ranges of pixels to be used for tentative detection of the first signal and the second signal, calculates a tentative image shift amount from the first signal and the second signal in the tentative distance detection ranges, defines distance detection ranges as ranges of pixels to be used for detection of the first signal and the second signal on the basis of the tentative image shift amount, increases or decreases the number of distance detection ranges for the defined distance detection ranges, and calculates the distance to the subject on the basis of the first signal and the second signal in the distance detection ranges.

9 Claims, 6 Drawing Sheets

(56) References Cited

U.S. PATENT DOCUMENTS

| | | | |
|---|---|---|---|
| 2011/0102663 A1 | 5/2011 | Ichimiya | |
| 2011/0249173 A1* | 10/2011 | Li | H04N 5/23212 348/349 |
| 2012/0057043 A1 | 3/2012 | Yamamoto | |
| 2014/0063234 A1 | 3/2014 | Nobayashi | |
| 2014/0362262 A1* | 12/2014 | Takagi | H04N 13/0271 348/294 |
| 2015/0097991 A1 | 4/2015 | Nobayashi | |

OTHER PUBLICATIONS

International Preliminary Report on Patentability issued in corresponding International Application No. PCT/JP2013/074776 dated Mar. 26, 2015.

International Search Report issued in corresponding International Application No. PCT/JP2013/074776 dated Feb. 5, 2014.

* cited by examiner

DISTANCE DETECTING DEVICE

TECHNICAL FIELD

The present invention relates to a distance detecting device. More particularly, the present invention relates to a distance detecting device to be used for an image pickup apparatus such as a digital camera or a digital video camera.

BACKGROUND ART

A solid state image pickup device formed by arranging pixels having a ranging function (to be referred to as distance measurement pixels hereinafter) as part or all of the pixels of the image pickup device in order to detect the distance to a subject by way of a phase difference detection method has been proposed (see, The Specification of Japanese Patent No. 4,027,113). A distance measurement pixel contains a plurality of photoelectric conversion sections therein and an image pickup device of the above-described type is so configured that light fluxes that pass through different pupil areas on the camera lens are guided to different photoelectric conversion sections. The optical images that are produced by light fluxes that have passed through different pupil areas are acquired by means of the signals obtained by the photoelectric conversion sections contained in each of the distance measurement pixels (to be referred to respectively as "image A" and "image B" hereinafter, which images may collectively be referred to as "images AB"). Then, the image pickup device detects the shift amount that is the amount of the relative positional change of the images AB (to be referred to also as "image shift amount" hereinafter). The distance to the subject to be imaged can be computationally determined by converting the image shift amount into a defocus amount. The expression of "defocus" refers to a situation where the imaging plane of the imaging lens does not agree with the image pickup plane (light receiving plane) and the imaging plane of the lens is shifted toward the optical axis and the quantity of defocus is referred to as defocus amount. With an arrangement as described above, the distance to the subject is measured unlike conventional contrast detection methods and hence the lens of the camera including such a device does not need to be moved for focusing. In other words, high speed and high accuracy ranging operations can be realized with such a device.

An image and a distance distribution (distance map) that corresponds to the image can be generated simultaneously by arranging a plurality of distance measurement pixels over the entire in-plane area of an image pickup device and using both image A and image B. The bokeh amount of a subject found in an image picked up by an image pickup device depends on the defocus amount and hence arbitrary image processing operations such as bokeh-addition processing, post-shooting refocus processing (a process of focusing at an arbitrary position) and/or other processing operations can be conducted appropriately by executing a processing operation on the basis of the distance distribution for the obtained image.

SUMMARY OF INVENTION

Technical Problem

The image shift amount of the images AB is proportional to the defocus amount. For this reason, when the defocus amount is large, large distance measurement ranges (ranges of pixels defined as target areas to be employed for the detection) need to be used to detect the image shift amount. When narrow distance measurement ranges are employed relative to a given defocus amount, the image shift amount may not be detected to give rise to a detection error status. On the other hand, a distance distribution having a higher in-plane spatial resolution in in-plane directions of the image pickup device is desirably acquired in order to execute an appropriate image processing operation for an image. For this reason, desirably small distance measurement ranges are defined and pixels are arranged highly densely.

Relatively large distance measurement ranges are defined in known distance detecting devices so that they may be able to handle subjects representing a large defocus amount. Then, as a result, there are instances where the in-plane spatial resolution of distance distribution is degraded. In view of the above identified problem, therefore, the object of the present invention is to provide a distance detecting device and devices utilizing such a device that can suppress image shift amount detection errors and generate a distance distribution representing a higher in-plane spatial resolution.

Solution to Problem

According to the present invention, there is provided a distance detecting device including computing unit for detecting a distance to a subject on the basis of a first signal due to a light flux that has passed through a first pupil area of an imaging optical system and a second signal due to a light flux that has passed through a second pupil area of the imaging optical system, the first signal and the second signal being generated by image pickup member formed by arranging a plurality of pixels. The computing unit is so configured as to execute a tentative region definition processing of defining tentative distance detection ranges as ranges of pixels to be used for tentative detection of the first signal and the second signal, a tentative image shift amount calculation processing of calculating a tentative image shift amount from the first signal and the second signal in the tentative distance detection ranges, a region definition processing of defining distance detection ranges as ranges of pixels to be used for detection of the first signal and the second signal on the basis of the tentative image shift amount, an increase/decrease processing of increasing/decreasing the number of distance detection ranges from the defined distance detection ranges, and a distance calculation processing of calculating the distance to the subject on the basis of the first signal and the second signal in the distance detection ranges defined by the increase/decrease processing.

Further features of the present invention will become apparent from the following description of exemplary embodiments with reference to the attached drawings.

Thus, the present invention can realize a distance detecting device that can suppress image shift amount detection errors and generate a distance distribution representing a higher in-plane spatial resolution. The present invention also can realize an image pickup apparatus and a distance detection method using such a distance detecting device.

Further features of the present invention will become apparent from the following description of exemplary embodiments with reference to the attached drawings.

DESCRIPTION OF EMBODIMENTS

Figure 1:
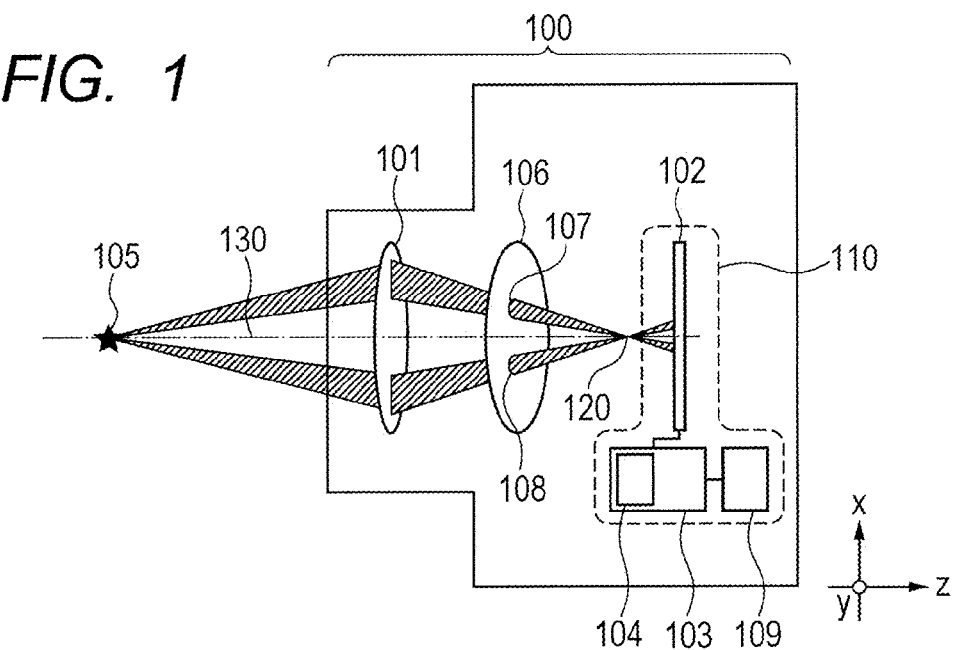
FIG. 1 is a schematic illustration of a digital camera equipped with a distance detecting device according to the present invention.

The present invention is characterized as follows. The distance to a subject is detected on the basis of a first subject image signal and a second subject image signal due to respective light fluxes that have passed through first and second pupil areas of an imaging optical system. For this purpose, the distance to the subject is calculated on the basis of the relative positional change of the first and second subject image signals within the distance detection ranges that are ultimately defined by way of a process of defining tentative distance detection ranges as ranges of pixels to be used for tentative detection of the first and second subject image signals. To be more detailed, distance detection ranges are defined as pixel ranges to be used for detecting the first and second subject image signals on the basis of the tentative image shift amount calculated from the relative positional change of the first and second subject image signals in the tentative distance detection ranges. Then, the distance to the subject is calculated on the basis of the relative positional change of the image signals within the distance detection ranges that are ultimately defined by way of increase/decrease processing for the number of distance detection ranges for the defined distance detection ranges. The criterion for defining tentative distance detection ranges, the criterion for defining distance detection ranges on the basis of a tentative image shift amount and the criterion for increasing/decreasing the number of distance detection ranges may be determined in various different ways by taking into consideration the condition of the subject to be imaged, the required accuracy level for distance detection and the in-plane spatial resolution required for a given distance distribution and other factors.

Now, embodiments of distance detecting device according to the present invention and image pickup apparatus and distance detecting methods using such a device will be described below by referring to the accompanying drawings. While the present invention is described below in terms of digital cameras as examples of image pickup apparatus including a distance detecting device according to the present invention, the scope of application of the present invention is by no means limited to digital cameras. The present invention is equally applicable to image pickup apparatus such as digital video cameras and live view cameras and also to digital distance measuring instruments. In the descriptions given below by referring to the drawings, the components having same functional features are denoted by the same reference symbols in principle and will not be described repeatedly.

First Embodiment

A digital camera equipped with this embodiment of distance detecting device according to the present invention will be described below.

Configuration of Distance Detecting Device

Referring to FIG. 1, 100 is a digital camera equipped with this embodiment of distance detecting device. The digital camera 100 includes an imaging lens 101, which is an imaging optical system, and a distance detecting device 110. The distance detecting device 110 of this embodiment is formed by using an image pickup device 102, which is an image pickup member, a distance detection section 103, which includes a computing section 104, and a memory 109. FIG. 1 illustrates a condition where the focus position 120 is defocused.

Figure 2A:
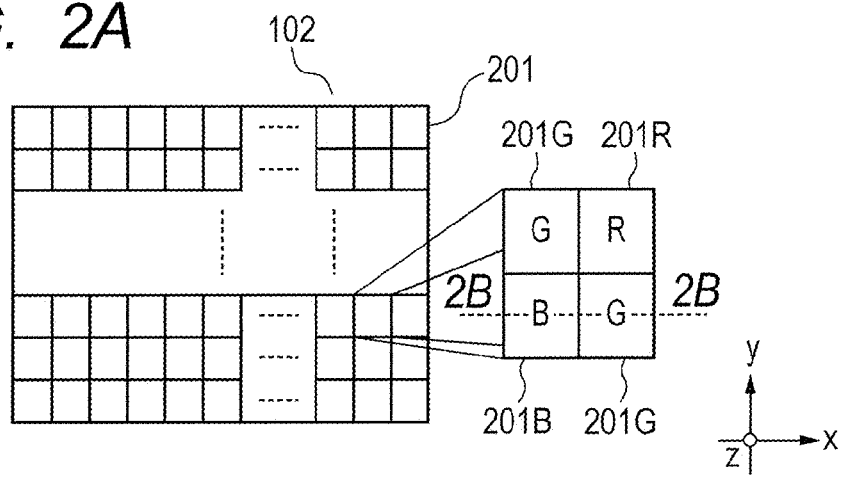
FIGS. 2A and 2B are a schematic illustration of the image pickup device according to an embodiment of the present invention.
Figure 2B:
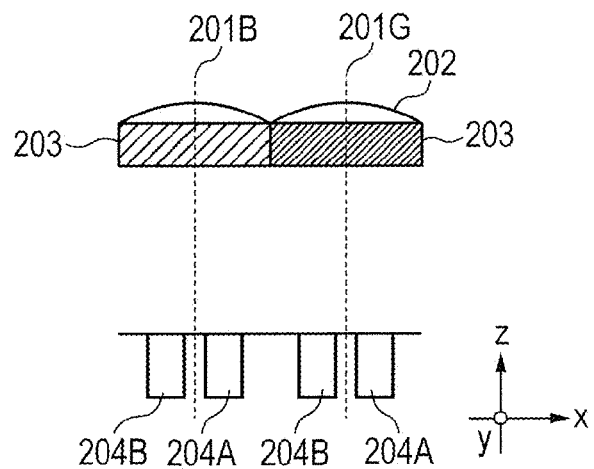

FIGS. 2A and 2B schematically illustrate the image pickup device 102 of the distance detecting device 110 of this embodiment. FIG. 2A also illustrates a pixel group 201 of the image pickup device 102, the pixels of the pixel group 201 being arranged in two rows and two columns. The four pixels of the pixel group 201 include two green pixels 201G arranged in a diagonal direction and a red pixel 201R and a blue pixel 201B that are arranged in the other diagonal direction. Such a pixel group 201 of four pixels arranged in two rows and two columns are repeatedly provided to produce a larger matrix of pixels. FIG. 2B is a schematic cross sectional view taken along line 2B-2B in FIG. 2A. In FIG. 2B, 202 denotes a micro lens and 203 denotes a color filter, while 204A and 204B denote respective photoelectric conversion sections. In the image pickup device 102 of this embodiment, two photoelectric conversion sections are arranged in each of the pixels (201R, 201G, 201B) and the power of the each micro lens 202 is so arranged that the photoelectric conversion sections and the exit pupil 106 of the imaging lens 101 represent an optically conjugate relationship. With the above-described arrangement, the photoelectric conversion section 204A and the photoelectric conversion section 204B can receive light fluxes that have passed through different respective areas 107, 108 of the exit pupil 106. The different areas 107, 108, for example, may be different areas that are symmetrical relative to the center of gravity of the pupil in the exit pupil 106. The photoelectric conversion section 204A and the photoelectric conversion section 204B respectively generate a first subject image signal and a second subject image signal out of the light fluxes they receive by photoelectric conversion. The first subject image signal is a signal generated by the photoelectric conversion section 204A and will also be referred to as image signal of pixel A hereinafter, while the second subject image signal is a signal generated by the photoelectric conversion section 204B and will similarly be referred to as image signal of pixel B hereinafter. Distance measurement pixels are arranged for all the pixels in the image pickup device 102 of the distance detecting device 110 of this embodiment. As distance measurement pixels as illustrated in FIGS. 2A and 2B are arranged for all the pixels, an image can be generated by using image signals of pixels A and image signals of pixels B. Additionally, a distance distribution that corresponds to the obtained image can also be generated simultaneously.

Figure 3:
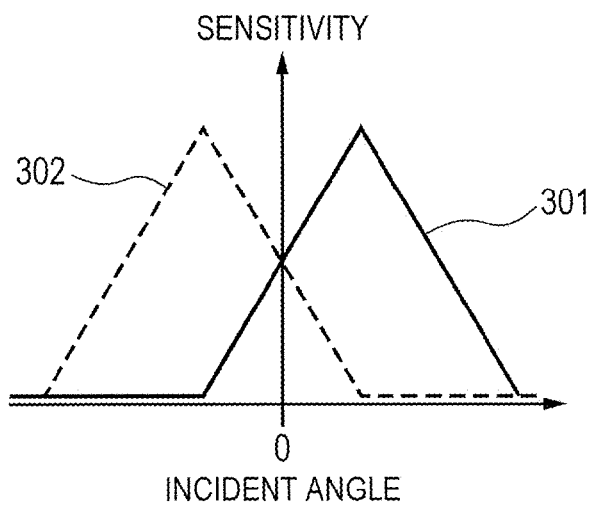
FIG. 3 is a schematic illustration of the pixel sensitivities of distance measurement pixels according to an embodiment of the present invention.

Image of subject 105 is formed in the image pickup device 102 by means of the imaging lens 101 in order to acquire distance information for the subject 105. A plurality of distance measurement pixels is arranged in the image pickup device 102 to acquire images (image A, image B) of the subject by means of light fluxes that have passed through different pupil areas (first pupil area 107 and second pupil area 108) of the exit pupil 106. The sensitivities of the distance measurement pixels of this embodiment represents incident angle dependence, which is symmetrical relative to incident angle=0' as illustrated in FIG. 3. In FIG. 3, the horizontal axis represents the incident angle that is the angle formed by the incoming rays of light and the optical axis (130 in FIG. 1) of the imaging optical system and the vertical axis represent the sensitivity. Solid line 301 indicates the sensitivity of pixel A that mainly receives the light flux from the first pupil area 107, while broken line 302 indicates the sensitivity of pixel B that mainly receives the light flux from the second pupil area 108. The distance to the subject is calculated as the computing section 104 in the distance detection section 103 executes a processing flow, which will be described hereinafter.

Processing Flow for Distance Detection

The processing of calculating the distance to a subject in the present embodiment will be described below by referring to the flowchart illustrated in FIG. 4. Note that FIGS. 5A through 5E are also referred to in the following description. FIG. 5A is a view of subject 501 taken from the z-direction and FIG. 5B is a view of the subject taken from the y-direction. In FIG. 5B, the solid line segment 502 indicates the position of the subject 501 and the broken line 503 indicates the focus plane of the imaging lens 101. FIGS. 5C through 5E illustrate image signals 504 of the subject 501. In each of FIGS. 5C through 5E, the horizontal axis represents the x coordinate on the image pickup device 102 and the vertical axis represents the image signal intensity.

Figure 4:
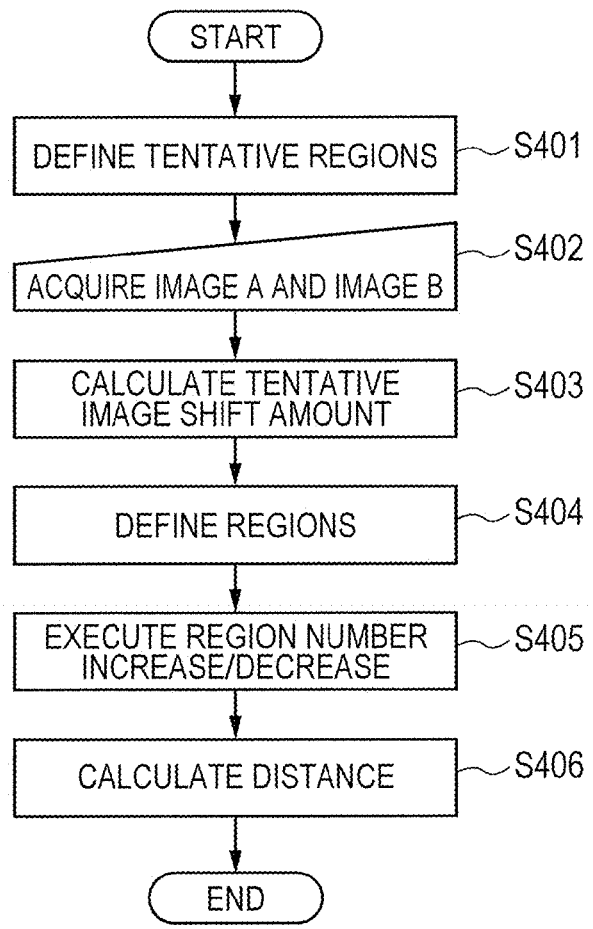
FIG. 4 is a flowchart of the distance-to-subject calculation processing according to an embodiment of the present invention.
Figure 5A:
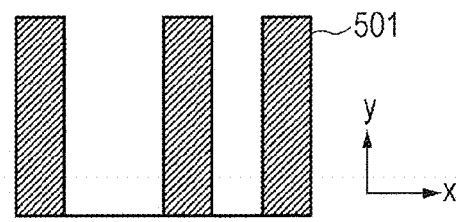
FIGS. 5A, 5B, 5C, 5D and 5E are a schematic illustration of the distance detection range definition method according to an embodiment of the present invention.
Figure 5B:
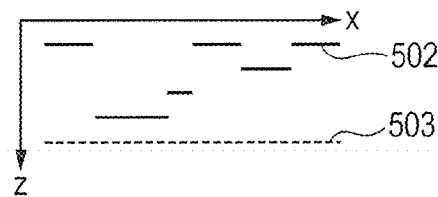
Figure 5C:
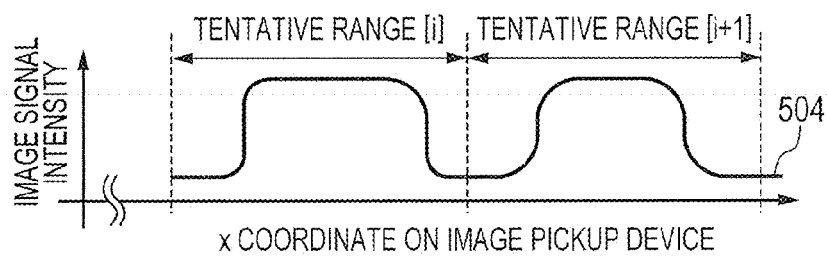
Figure 5D:
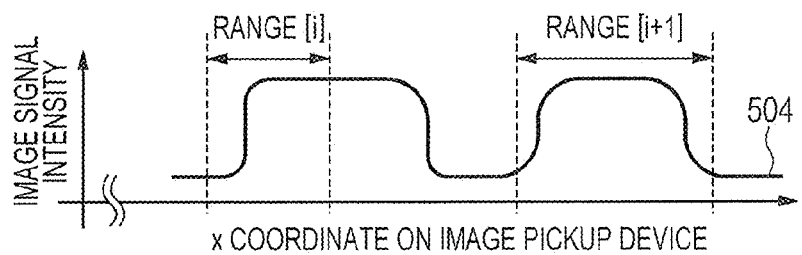
Figure 5E:
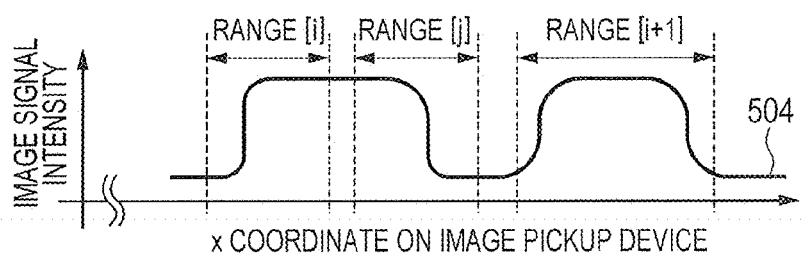

Referring to FIG. 4, Step S401 is a step of executing tentative region definition processing. In Step S401, tentative distance detection ranges (tentative ranges [i], [i+1]) on the image pickup device 102 are defined in a manner as illustrated in FIG. 5C. When narrow tentative distance detection ranges are defined, the relative positional change of the image A and the image B may not be detected and a distance detection error status may occur. For this reason, large tentative distance detection ranges are defined. As the criterion for defining tentative distance detection ranges, for example, the maximum value of the image shift amount is calculated from an assumed maximum defocus amount and the F value of the imaging lens 101 and the widths of tentative distance detection ranges are defined so as to be greater than the maximum image shift amount. Then, tentative distance detection ranges are arranged from an edge of the image pickup device. In this embodiment, a subject identifying process of identifying the subject on the basis of the brightness information obtained from the pixels of the image pickup device 102 and computing the size of the subject is executed prior to executing Step S401. FIG. 5C illustrates an instance where the subject included in the tentative range [i] and the subject included in the tentative range [i+1] are determined to be different subjects because a large subject brightness changing rate is observed between the tentative range [i] and the tentative range [i+1]. Furthermore, the tentative distance detection ranges are defined to be larger than the maximum value of the image shift amount so as to cover the subjects. The only requirements to be met in the subject identifying step are that the observed subjects are identical or not and that the size of the subject can be calculated. Color information (image signals of red pixels image signals of green pixels, image signals of blue pixels) may be used for example. The positions and the widths of the tentative distance detection ranges may be determined in advance without relying on the subject to be imaged. The number of necessary processing steps can be reduced and the distance to a subject can be detected faster by defining tentative distance detection ranges in advance.

In Step S402, image A and image B of the subject are acquired within the tentative distance detection ranges and transmitted to the distance detection section 103. In Step S403, which is a tentative image shift amount calculation processing step, the image shift amount in each of the tentative distance detection ranges is calculated. A correlation operation is conducted on image A and also on image B to determine the image shift amount. A known technique can be employed for such correlation operations. For example, correlation value S(k) can be calculated by means of Math. 1 represented below and image shift amount r can be calculated by using k that makes S(k)=0. In Math. 1, A(m) is the image signal data of image A and B(m) is the image signal data of image B, while m is the pixel number and k is the relative shift amount of image A and image B. p and q indicate the tentative distance detection ranges to be used for the calculation of correlation value S(k).

$$S(k) = \sum_{m=p}^{q} |A(m+k+1) - B(m)| - |A(m+k) - B(m+1)|$$ Math. 1

In Step S404, which is a range definition processing step, the distance detection ranges to be used are defined on the basis the image shift amount calculated in Step S403. To be specific, narrow distance detection ranges are defined when the image shift amount is small. To be more specific, pixel ranges whose widths are substantially equal to the image shift amount calculated in Step S403 are used to define the distance detection ranges. More desirably, ranges broader than a range whose width is greater than the image shift amount calculated in Step S403 by several pixels are selected by taking into consideration the image shift amount calculation error attributable to noises that typically include optical shot noises. In Step S401, broad distance detection ranges (tentative ranges [i], [i+1]) are defined to avoid any image shift amount detection error. In Step S404, on the other hand, distance detection ranges (ranges [i], [i+1] in FIG. 5D) that are narrower than the tentative distance detection ranges defined in Step S401 can be defined by limiting the widths of the distance detection ranges only to those that are necessary for detecting the image shift amount on the basis of the image shift amount calculated in Step S403. The tentative range [i] includes one or more than one subjects that are located close to the focus plane 503 and one or more than one subjects that are located away from the focus plane 503. In other words, when the image shift amount is calculated by means of Math. 1, a plurality of image shift amounts are produced. In this embodiment, the values of the plurality of image shift amounts are compared with each other and the range [i] is defined so as to match the largest image shift amount.

Distance detection errors can be avoided by making the width of the range [i] match the largest image shift amount. The range [i] is so defined as to include the subject edges. Like the tentative range [i], the tentative range [i+1] is defined on the basis of the image shift amounts calculated in Step S403. In this embodiment, the widths of the distance detection ranges are made to match the image shift amounts. The in-plane spatial resolution of the produced distance distribution can be raised by limitatively making the widths substantially match the image shift amounts. Note that, if interpolation operations are employed at the time of calculating the image shift amounts by correlation operations, distance detection ranges are desirably defined so as to make them match the amounts obtained by adding about 10 pixels to the image shift amounts. Interpolation operations using values close to k that realize S(k)~0 can be conducted by defining distance detection ranges that match the amounts obtained by adding about 10 pixels to the image shift amounts. Then, image shift amounts can be detected more accurately in Step S406, which will be described hereinafter.

In Step S405, which is a region number increase/decrease processing step, a process of adding a distance detection range is executed. The widths of the ranges [i] and [i+1], which are distance detection ranges, are changed in Step S404. In Step S405, on the other hand, a process of further adding a distance detection range between each distance detection range is executed. For example, as illustrated in FIG. 5E, a range [j] is added between the range [i] and the range [i+1]. When the range [j] is included in the tentative range [i], the width of the range [j] is defined so as to be equal to the width of the range [i]. As a result of the above-described steps, distance detection ranges can be arranged densely and hence a distance distribution having a higher in-plane spatial resolution can be produced. While a distance detection range is added in the above description, the number of distance detection ranges can be decreased appropriately in instances where the number of distance detection ranges is excessively large. If one of the edges of a subject is not included in the range [i], the range [j] is made to include the edge in this increase/decrease processing step. There can be instances where the number of distance detection ranges remains unchanged after the Step S405.

In Step S406, the image shift amount r is calculated by means of a correlation operation for each of the distance detection ranges defined in Step S405. While the image shift amount is calculated by means of Math. 1, the values of p and q in Math. 1 differs from those employed in Step S403. The image shift amount r is converted into an image side defocus amount ΔL by means of Math. 2 represented below.

$$\Delta L = rL/(w-r)$$ Math. 2 where L is the distance from the image pickup device 102 to the exit pupil 106 and w is the base line length.

Note that the pixel sensitivities 301, 302 of distance measurement pixels are projected onto the exit pupil 108 and the positions of the centers of gravity of the respective pixels are calculated. The distance between the centers of gravity is the base line length. If necessary, after calculating the defocus amount at the image side, the calculated defocus amount may be converted via the focal length of the imaging lens 101 into the defocus amount at the object side and the distance to the subject.

If the number of distance detection ranges is not changed as a result of Step S405, each of the distance detection ranges defined in Step S405 is same as the corresponding one of the distance detection ranges defined in Step S404.

Thus, with the distance detecting device 110 of this embodiment, distance detection ranges can be arranged densely by appropriately defining distance detection ranges on the basis of the image shift amounts in the tentative distance detection ranges. Then, as a result, a distance distribution representing a higher in-plane spatial resolution can be produced.

Figure 6:
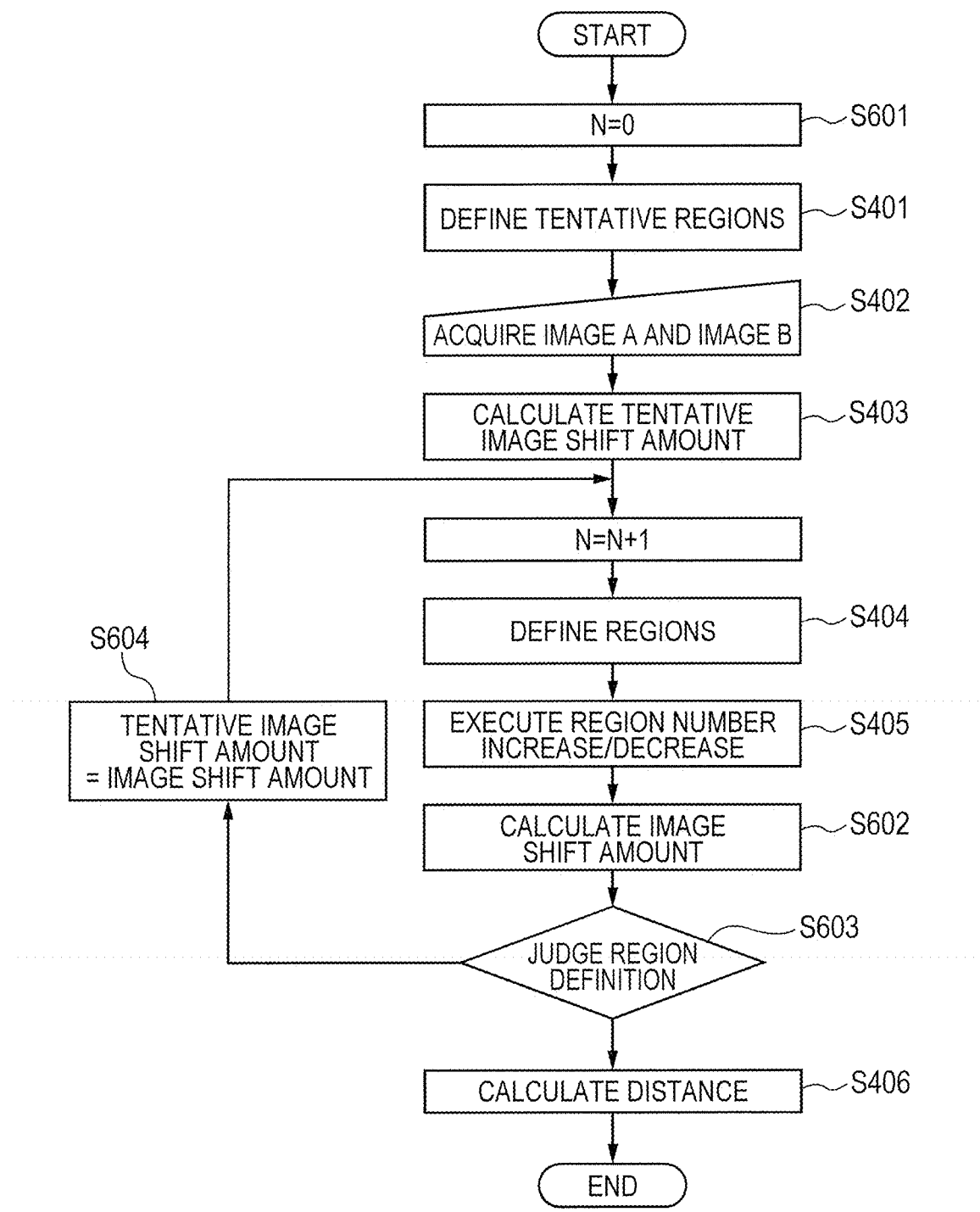
FIG. 6 is a flowchart of the distance-to-subject calculation process according to another embodiment of the present invention.

While the distance to a subject is detected by following the flowchart illustrated in FIG. 4, a process that follows the flowchart illustrated in FIG. 6 may alternatively be executed. In FIG. 6, N denotes the number of times by which regions are defined. In Step S602, the image shift amount is calculated on the basis of the result of region defining operations executed in Steps S404 and S405. If the difference between the tentative image shift amount calculated in Step S403 and the image shift amount calculated in Step S602 is less than a predefined threshold value or N is larger than a predetermined value in Step S603, the process proceeds to the distance calculating processing step of Step S46. Otherwise, the process proceeds to Step S604, which is a processing step of substituting the image shift amount calculated in Step S602 for the tentative image shift amount. A distance distribution representing a higher in-plane spatial resolution can be produced by executing the processing steps of Steps S404 and S405 for a plurality of times. Then, a situation where regions are defined for an excessively large number of times to consume too much time for the purpose of distance detection can also be avoided.

While distance detection ranges are defined in Step S404 in such a way that some of the center positions of the tentative distance detection ranges defined in the tentative range defining step of Step S401 differ from the corresponding ones of the center positions of the distance detection ranges defined in the range defining step of Step S404 in this embodiment, the distance detection ranges may alternatively be so defined that all of the center positions of the tentative distance detection ranges agree with the respective center positions of the distance detection ranges. Still alternatively, the subject edges may be detected by using the subject image signals before executing the tentative range defining step of Step S401 or the range defining step of Step S404 and distance detection ranges may be arranged such that the center positions of the distance detection ranges agree with subject edge sections. When distance detection ranges are defined so as to be centered at edge sections, edge sections that may become problematic can be processed more appropriately at the time of image processing that may include refocus processing and image processing can be conducted in a natural way.

Figure 7A:
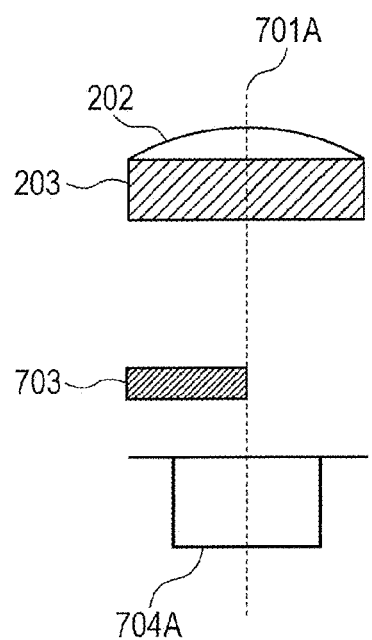
FIGS. 7A and 7B are a schematic illustration of an image pickup device formed by using another embodiment of the present invention.
Figure 7B:
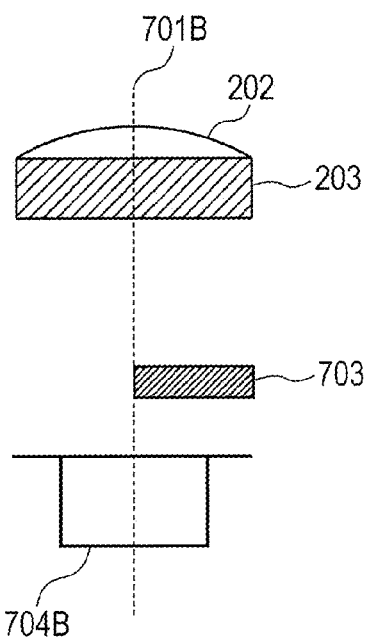

While each of the pixels of the image pickup device 102 of this embodiment includes two photoelectric conversion sections as illustrated in FIG. 2B, each of the pixels of the image pickup device 102 may alternatively be made to include only a single photoelectric conversion section as illustrated in FIGS. 7A and 7B. FIGS. 7A and 7B are schematic cross sectional views taken along the xz plane of two different pixels that image pickup device 102 includes. The pixels 701A and 702B are partly shielded by respective shield sections 703. As a result of partly shielding the pixels by means of the respective shield section 703, the photoelectric conversion section 704A can acquire a light flux from the first exit pupil area 107 and the photoelectric conversion section 704B can acquire a light flux from the second pupil area 108.

Second Embodiment

Figure 8A:
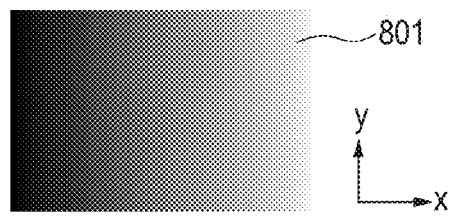
FIGS. 8A, 8B, 8C, 8D and 8E are a schematic illustration of the distance detection range definition method according to another embodiment of the present invention.
Figure 8B:
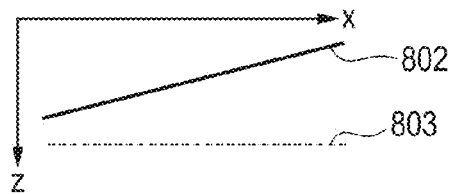
Figure 8C:
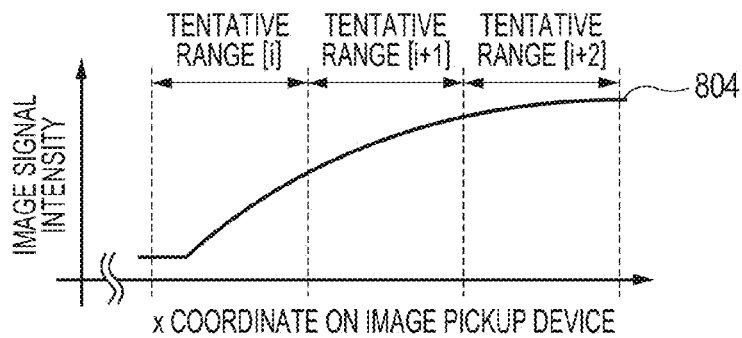
Figure 8D:
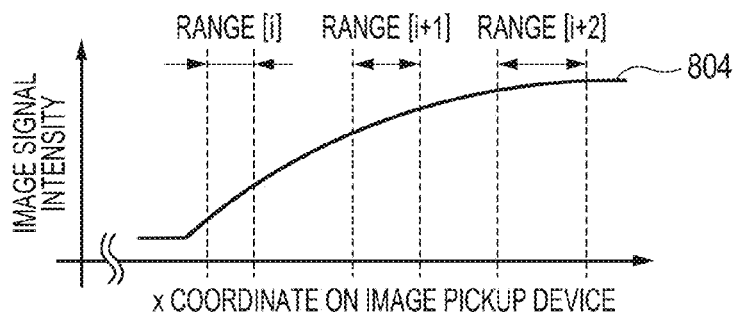
Figure 8E:
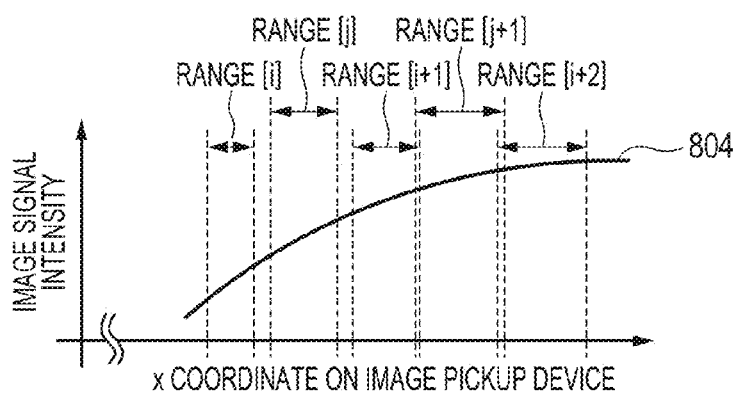

Now an embodiment that is designed to employ a distance detection range definition technique that is suitable for a subject that differs from the subject described above for the first embodiment will be described below. The subject 801 described here for the second embodiment represents a subject brightness that gradually changes as illustrated in FIG. 8A. FIG. 8B schematically illustrates the subject 801 as viewed from the y-direction. The subject 801 is arranged so as to become gradually remote from the focus plane 803 in the +x-direction. This embodiment will also be described by referring to the flowchart of FIG. 4. FIGS. 8C through 8E illustrate subject image signals 804 like FIGS. 5A through 5E.

In Step S401, tentative distance detection ranges are defined to be the same width and tentative ranges [i] through [i+2] are arranged in a manner as illustrated in FIG. 8C. In Step S402, image A and image B of the subject are obtained and transmitted to distance detection section 103. In Step S403, correlation operations are conducted using Math. 1 to determine the image shift amount in each of the tentative distance detection ranges. In Step S404, the widths of the ranges [i] through [i+2] that are distance detection ranges are defined on the basis of the image shift amounts in the tentative distance detection ranges as illustrated in FIG. 8D. The center positions of the distance detection ranges are made to agree with the center positions of the respective tentative distance detection ranges.

In Step S405, which is a region addition processing step, range [j] is added between the range [i] and the range [i+1] and range [j+1] is added between the range [i+1] and the range [i+2] to increase the number of distance detection ranges. The widths of the distance detection ranges arranged adjacently at the opposite sides of each of the added distance detection ranges are compared and the width of the added distance detection range is made to agree with the larger one of the compared widths. With this arrangement, a distance detection error due to narrow distance detection ranges can be prevented from taking place. One or more than one distance detection ranges that are to be added may be so defined as to overlap some of the existing distance detection ranges like range [j+1] illustrated in FIG. 8E that partly overlaps range [i+1] and range [i+2]. In Step S406, a distance detection operation is executed in each of the distance detection ranges defined in Step S405.

Thus, with the distance detecting device 110 of this embodiment, distance detection ranges can be arranged densely by appropriately defining distance detection ranges on the basis of the image shift amounts in the tentative distance detection ranges. Then, as a result, a distance distribution representing a higher in-plane spatial resolution can be produced.

Other Embodiments

The object of the present invention can be achieved by an embodiment that will be described below. Namely, a memory or a recording medium that stores the program codes of a software product that is designed to realize the functions of the above-described embodiments (computing unit and other features) is supplied to a distance detecting device. Then, a computer (or CPU or MPU, whatever appropriate) reads out the program codes stored in the memory medium and executes the above functions. In such an instance, the program codes themselves that are read out from the memory medium realize the functions of the above-described embodiments and hence the program, or the software product, and the memory medium that stores the program constitute part of the present invention.

Additionally, as a computer reads out the program codes and executes them, the operating system (OS) that is operating on the computer according to the instructions of the program codes executes all or part of the actual processing operations. Then, instances where the functions of the above-described embodiments are realized by the processing operations also constitute part of the present invention. Furthermore, assume that the program codes read out from the memory medium are written into a feature expansion card inserted into a computer or into a memory with which a feature expansion unit connected to a computer is provided. Then, instances where the CPU or the like provided in the feature expansion card or the feature expansion unit executes all or part of the actual processing operations according to the instructions of the program codes and the functions of the above-described embodiments are realized as a result of the processing operations also constitute part of the present invention. When the present invention is applied to a memory medium in a manner as described above, the program codes that correspond to the above-described flowcharts are stored in the memory medium.

When considering applications of the present invention to digital cameras and other devices, the present invention may be understood to provide devices that are suitable for so-called imaging surface ranging that includes distance detections by means of an image pickup section rather than distance detecting devices (to be used in a single lens reflex camera or the like) dedicated for distance detections and separated from any image pickup sections for picking up an image of a subject. As pointed out above, the computing section of a distance detecting device according to the present invention can be formed by using an integrated circuit prepared by integrally combining semiconductor devices. In other words, the computing section can be formed by using an IC, an LSI, a system LSI, a micro processing unit (MPU) and/or a central processing unit (CPU). When the computing section is formed by using a micro processing unit or a central processing unit (CPU), the computing section can be regarded as a computer. As a computer program designed to realize the present invention is installed in the computer of an image pickup device that includes a predetermined imaging optical system, a predetermined image pickup section and a computer, the computer program makes the image pickup device capable of operating for high accuracy distance detections. A computer program designed to realize the present invention can be stored in mediums as described above and distributed by way of Internet.

A distance distribution (distance map) that corresponds to an image obtained by an image pickup device can be produced by using the distances detected by a distance detecting device according to the present invention. Since the bokeh amount of the subject in an image depends on the defocus amount, bokeh-addition processing, post-shooting refocus processing (processing for focusing at a voluntary position) and other image processing can be appropriately realized by executing relevant processing operations on an obtained image based on distance distribution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-200059, filed on Sep. 12, 2012, and No. 2013-161914, filed on Aug. 3, 2013, which are hereby incorporated by reference herein in their entirety.

The invention claimed is:

1. A distance detecting device comprising computing unit for detecting a distance to a subject on the basis of a first signal due to a light flux that has passed through a first pupil area of an imaging optical system and a second signal due to a light flux that has passed through a second pupil area of the imaging optical system, the first signal and the second signal being generated by image pickup member formed by arranging a plurality of pixels, the computing unit being so configured as to execute:
   a tentative region definition processing of defining tentative distance detection ranges as ranges of pixels to be used for tentative detection of the first signal and the second signal;
   a tentative image shift amount calculation processing of calculating a tentative image shift amount from the first signal and the second signal in the tentative distance detection ranges;
   a region definition processing of defining distance detection ranges as ranges of pixels to be used for detection of the first signal and the second signal on the basis of the tentative image shift amount;
   an increase/decrease processing of increasing/decreasing the number of distance detection ranges from the defined distance detection ranges; and
   a distance calculation processing of calculating the distance to the subject on the basis of the first signal and the second signal in the distance detection ranges defined by the increase/decrease processing.

2. The device according to claim 1, wherein the increase/decrease processing is a region addition processing of adding one or more than one distance detection ranges to the defined distance detection ranges.

3. The device according to claim 1, wherein provided that more than one subjects are detected, the computing unit determines that the detected subjects are identical or not on the basis of at least either the first signal or the second signal and also executes a determination processing of computing the size of the subject.

4. The device according to claim 3, wherein the tentative distance detection ranges are arranged in the tentative region definition processing to cover the subject that is determined to be identical in the subject determination processing.

5. The device according to claim 3, wherein the edges of the subject are determined from the subject brightness changing rate on the basis of at least either the first signal or the second signal and the center positions of the distance detection ranges are defined so as to make the distance detection ranges include the edges in the region definition processing.

6. The device according to claim 2, wherein the width of the distance detection range or each of the distance detection ranges to be added is defined by comparing the widths of the distance detection ranges to be located at the opposite sides thereof and made to agree with the larger width.

7. An image pickup apparatus comprising:
   image pickup member formed by arranging a plurality of pixels;
   an imaging optical system for forming an image of a subject in the image pickup member; and
   a distance detecting device comprising a computing unit for detecting a distance to the subject on the basis of a first signal due to a light flux that has passed through a first pupil area of the imaging optical system and a second signal due to a light flux that has passed through a second pupil area of the imaging optical system, the first signal and the second signal being generated by the image pickup member formed by arranging a plurality of pixels, the computing unit being so configured as to execute:
   a tentative region definition processing of defining tentative distance detection ranges as ranges of pixels to be used for tentative detection of the first signal and the second signal;
   a tentative image shift amount calculation processing of calculating a tentative image shift amount from the first signal and the second signal in the tentative distance detection ranges;
   a region definition processing of defining distance detection ranges as ranges of pixels to be used for detection of the first signal and the second signal on the basis of the tentative image shift amount;
   an increase/decrease processing of increasing/decreasing the number of distance detection ranges from the defined distance detection ranges; and
   a distance calculation processing of calculating the distance to the subject on the basis of the first signal and the second signal in the distance detection ranges defined by the increase/decrease processing.

8. A non-transitory computer-readable storage medium storing a program for causing a computer to detect a distance to a subject on the basis of a first signal due to a light flux coming after passing through a first pupil area of the imaging optical system and a second signal due to a light flux coming after passing through a second pupil area of the imaging optical system, the first signal and the second signal being generated by image pickup member formed by arranging a plurality of pixels to execute:
   a tentative region definition step of defining tentative distance detection ranges as ranges of pixels to be used for tentative detection of the first signal and the second signal;
   a tentative image shift amount calculation step of calculating a tentative image shift amount from the first signal and the second signal in the tentative distance detection ranges;
   a region definition step of defining distance detection ranges as ranges of pixels to be used for detection of the first signal and the second signal on the basis of the tentative image shift amount;
   an increase/decrease step of increasing/decreasing the number of distance detection ranges from the defined distance detection ranges; and
   a distance calculation step of calculating the distance to the subject on the basis of the first signal and the second signal in the distance detection ranges defined in the increase/decrease step.

9. A distance detection method of detecting a distance to a subject on the basis of a first signal due to a light flux coming after passing through a first pupil area of an imaging optical system and a second signal due to a light flux coming after passing through a second pupil area of the imaging optical system, the first signal and the second signal being generated by image pickup member formed by arranging a plurality of pixels to execute:
   a tentative region definition step of defining tentative distance detection ranges as ranges of pixels to be used for tentative detection of the first signal and the second signal;
   a tentative image shift amount calculation step of calculating a tentative image shift amount from the first signal and the second signal in the tentative distance detection ranges;

a region definition step of defining distance detection ranges as ranges of pixels to be used for detection of the first signal and the second signal on the basis of the tentative image shift amount;

an increase/decrease step of increasing/decreasing the number of distance detection ranges from the defined distance detection ranges; and a distance calculation step of calculating the distance to the subject on the basis of the first signal and the second signal in the distance detection ranges defined in the increase/decrease step.

\* \* \* \* \*